United States Patent [19]

Van Coillie

[11] 4,334,561

[45] Jun. 15, 1982

[54] HEAD PIECE FOR A TANK FOR LIQUEFIED GAS

[75] Inventor: Andre S. J. Van Coillie, Uccle, Belgium

[73] Assignee: Valico P.v.b.a., Tienen, Belgium

[21] Appl. No.: 106,242

[22] Filed: Dec. 21, 1979

[30] Foreign Application Priority Data

Jan. 3, 1979 [BE] Belgium .................................. 192745

[51] Int. Cl.³ .............................................. B65B 3/04
[52] U.S. Cl. .................................... 141/392; 137/551; 220/86 R
[58] Field of Search ............... 141/198, 285, 301, 302, 141/392; 137/551; 220/86 R

[56] References Cited

U.S. PATENT DOCUMENTS 3,640,320  2/1972  Elkuch .................................. 141/198

Primary Examiner—Frederick R. Schmidt
Attorney, Agent, or Firm—Scully, Scott, Murphy & Presser

[57] ABSTRACT

A head piece for a tank for liquefied gas to be mounted in a luggage compartment of a vehicle between an inlet conduit and an outlet conduit, comprising an over-pressure safety valve, a filling valve with a one-way protection, a delivery valve with a flow-limiter and a level meter, or some of these, which head piece is of block-shaped construction and equipped with a compartment communicating with the atmosphere, through which compartment any leakage gas is discharged.

8 Claims, 6 Drawing Figures

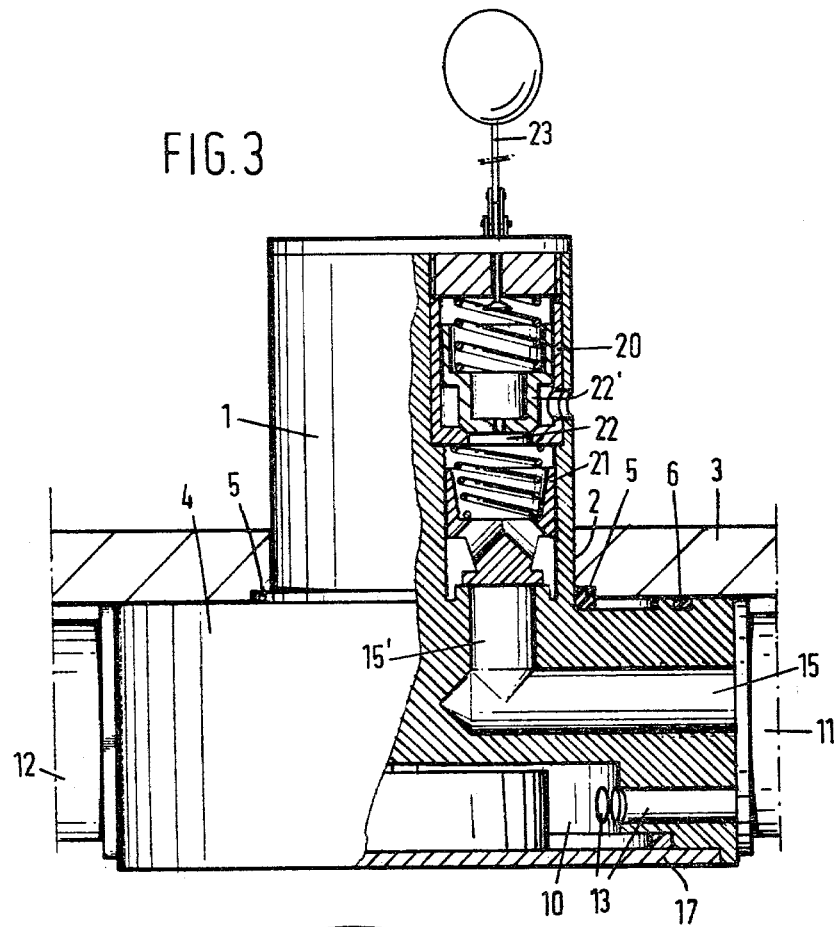
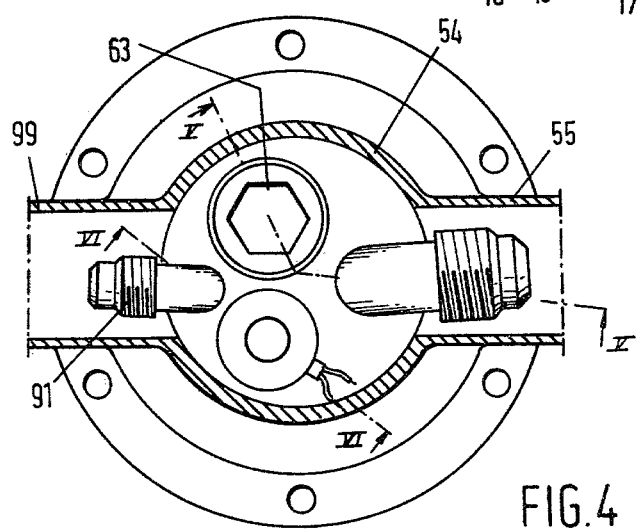

HEAD PIECE FOR A TANK FOR LIQUEFIED GAS

This invention relates to a head piece for a tank for liquefied gas to be mounted, for example, in a luggage compartment of a vehicle, between an inlet conduit and an outlet conduit, comprising an over-pressure safety valve, a filling valve with one-way protection, a delivery valve with a flow limiter, and a level meter, or some of these.

When the engine of a vehicle is connected to a so-called L.P.G. tank and this tank or gas cylinder is mounted in the luggage compartment of the vehicle, special precautionary measures should be taken to prevent the accumulation of gas in the compartment.

Thus it has already been proposed for the L.P.G. tank or cylinder to be housed in a separate space, or for the cocks or valves that must be provided on such a tank to be mounted in a gas-tight enclosure or cabinet which is in communication with the atmosphere.

The provision of partitions in the luggage compartment is of course a very expensive solution, which from the point of view of safety is a very inadequate one at that. Mounting the valves or cocks in a separate space, such as a gas-tight cabinet will limit security to the resistance of the cabinet proper.

It is an object of the present invention to provide an original solution which provides greater security, as well as a highly compact and block-shaped construction of the head piece according to the invention.

For this purpose the valves referred to above are accommodated in said head piece, which head piece fits at least in part in an opening provided in said tank, said head piece comprising at least a first compartment which communicates through at least one tube to the atmosphere outside said luggage compartment, the arrangement being such that the over-pressure safety valve opens into said first compartment, while any leakage from the inlet conduit is collected in said tube, and any leakage from the outlet conduit is collected in a tube provided around said outlet conduit, which tube is in turn in communication with said first compartment.

Advantageously, the head piece according to the invention comprises a first cylindrical portion fitting in the opening of the tank, and a second cylindrical portion contiguous with said first cylindrical portion and maintained into gas-tight contact with said tank by means of bolts, said second cylindrical portion comprising said first compartment which by means of at least one tube is in communication with the atmosphere outside the luggage compartment of the vehicle.

A different solution is provided in that said first compartment is constituted by a hood-shaped cover by means of which the head piece, which consists of said cover and a housing, is held in position on the tank or a mounting plate thereof, and to which cover the inlet and outlet conduit and the respective tubes are connected.

In one embodiment of the invention the housing is provided with a flange, said flange having a diameter ranging between those of sealing rings provided in recesses of the mounting plate or the tank, the corresponding recess in the cover having a larger diameter, and the space thus formed between said flange and the recess in the cover communicating via a bore with said first compartment.

Other features and advantages of the invention will appear from the following description of some exemplary embodiments of the present invention, with reference to the accompanying drawings. In said drawings, FIG. 1 is a front-elevational view of a first embodiment of the head piece according to the present invention;

FIG. 3 is a cross-sectional view, taken on the line III—III of FIG. 1;

FIG. 4 is a plan view of a second embodiment of the head piece according to the invention.

Figure 1:
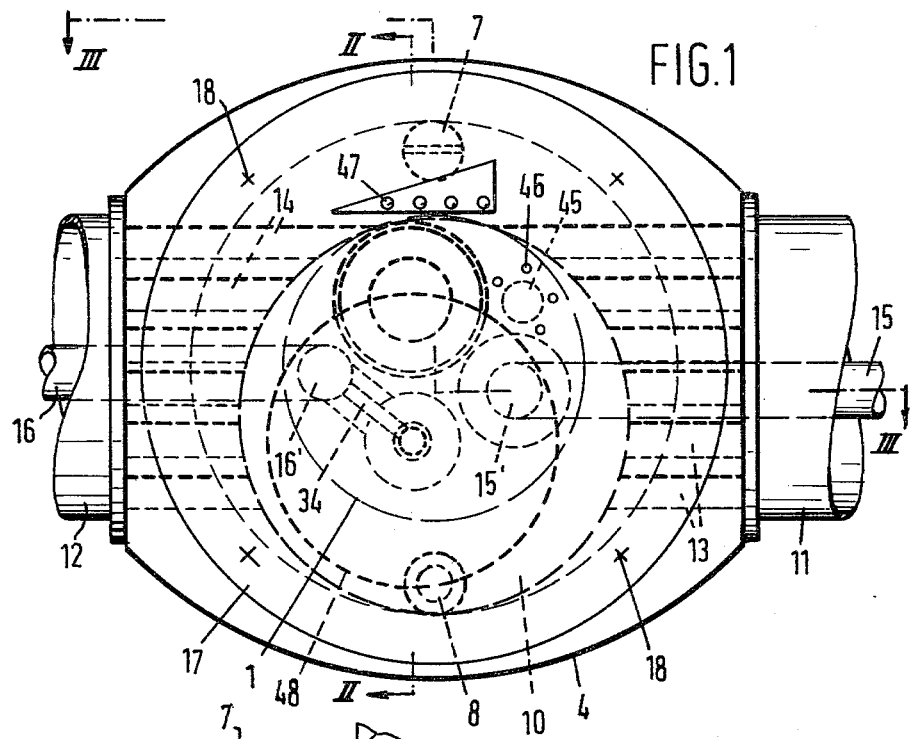

Referring to the drawings, the head piece shown is destined to be fixed to the so-called mounting plate of an L.P.G. tank or to the collar around an appropriate opening in said tank.

Before describing the head piece in detail, it is noted that the valves and cocks which may, or must, be provided on an L.P.G. tank or cylinder are at least some of the following:

1. Two one-way valves provided in the inlet conduit for the liquefied gas, and at least one of which is provided in the tank. One of these effects an automatic shut-off, by virtue of which the filling of the tank is limited on a percentage-basis by a float mechanism.

2. A valve which completely shuts off the withdrawal of gas when the engine of the vehicle is stopped.

3. A valve which shuts off the supply of gas in the event of a leak in the output conduit downstream of the head piece.

4. An additional facility which can be reckoned among this equipment is a level meter to be read on the dashboard.

Figure 2:
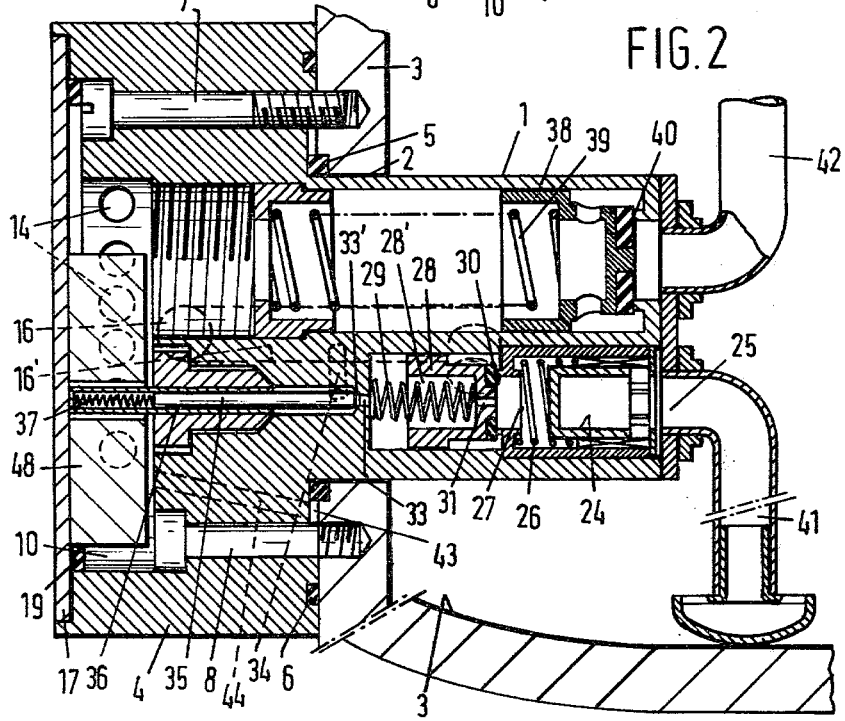
FIG. 2 is a cross-sectional view, taken on the line II—II of FIG. 1.

The head piece according to the present invention comprises a purely cylindrical portion 1 which fits in the circular opening 2 of an L.P.G. tank 3 (FIG. 2).

In the embodiment shown in FIGS. 1-3, the opening 2 is provided in a so-called mounting plate of tank 3.

Contiguous with cylindrical portion 1 of the head piece is a portion 4 which through the intermediary of sealing rings 5 and 6 is connected to the L.P.G. tank in gas-tight relationship. For this purpose, use is made of a number of bolts 7 passing through bores 8 in between the concentric sealing rings 6 and 6 (FIG. 2).

In the portion 4 of the head piece, along the side directed towards a cover plate 17 thereof, there is provided a first compartment 10 which through openings 13 and 14, provided along both sides, and tubes 11 and 12 is in communication with the atmosphere outside the luggage compartment of the vehicle (FIG. 1).

Openings 13 terminate in tube 11, extending up to the wall of the vehicle luggage compartment concentrically around an input conduit 15 to the block, so that gas that would be present in tube 11 from compartment 10 can be discharged to the atmosphere.

Like openings 14 terminate diametrically relative to openings 13 in tube 12, extending concentrically around the gas supply line to the engine, or gas output conduit from block 16.

Compartment 10 is bounded by cover plate 17, mounted by means of bolts 18 provided on the outside of a sealing ring 19.

The head piece, i.e., the first cylindrical portion 1 and 2 and the second, substantially cylindrical portion 4, mounts the above valves. A valve 20 determines the maximum permissible amount of gas in the tank. In practice this is limited to approximately 80% of the capacity of the tank.

Valve 20 has a passage 22 with a valve member 22' that can be closed under the influence of a float mechanism 23, for example, when the liquefied gas reaches a level corresponding to a filling of approximately 80% of the capacity of the tank. Such a valve 20, cooperating with a one-way valve 21, is the subject-matter of Belgian patent specification No. 871,180 in the name of van Coillie and Mrena.

One-way valve 21 is of course provided upstream of the so-called 80% filling valve 20, and connects direct with a portion 15', bent for structural reasons, of conduit 15.

Additionally provided in the fluid path to the engine is a valve or flow limiter 24, mounted in cylindrical portion 1 downstream of inlet 25, and arranged to be pressed against the action of a spring 26 into contact with a seat 27 under the influence of a sudden rise in dynamic pressure resulting from any downstream tube fracture that may occur.

Accommodated in the same valve body, and coextensive with flow limiter 25, is a piston shaped delivery valve 28, which is held on its seat 30 by a spring 29. At its bottom, valve 28 has a small bore 31, so that the liquid gas can flow through this and through the cavity 28' of the piston of valve 28 to reach the engine through bore 33, a by-pass 34 and conduits 16'-16. However, the passageway to bore 33 only remains open so long as the small bore 31 remains free, that is to say, so long as coil 48 attracts core 35. Indeed, valve 28 is lifted off its seat 30 owing to the difference in pressure of the liquid upstream and downstream of bore 31.

Core 35 is accommodated in a gas-tight cylindrical cavity 36. A spring 37 pushes core 35 onto seat 33', but when coil 48 is energized core 35 is moved away from its seat 33', so that gas can flow through opening 33 and by-pass 34. Coil 48 is normally energized when the ignition key of the vehicle closes the electric circuit of the engine.

When the coil is not energized and core 35 closes opening 33 under the influence of spring 37 an equilibrium is established between the pressure in cavity 28' and the pressure prevailing upstream of bore 31.

Owing to this condition of equilibrium of the pressure on opposite sides of piston 28, the latter is held on its seat 30 by spring 29. Such a valve is described in the above Belgian patent in the name of van Coillie and Mrena.

Accordingly flow limiter 24 shuts off the supply of gas when, owing to a sudden rise in flow rate resulting from tube fracture, the dynamic pressure keeps valve 24 into contact with seat 27 against the action of the light spring 26. In addition, the supply of gas to the engine through conduit 15 is also closed when the electric circuit of the engine is interrupted by the ignition key.

In addition to the valves described, portion 1 of the head piece further mounts a safety valve 38, which safeguards the gas tank against over-pressure. This safety valve is held down onto its seat 40 by a spring 39. Any gas that may be admitted into the valve body will be vented at the side away from the seat into compartment 10, which through openings 13 and 14 and the subsequent tubes 11 and 12 communicates with the atmosphere (FIG. 1).

The cylindrical valve bodies incorporating valves 24–28, on the one hand, and safety valve 38, on the other, are connected at the side away from compartment 10 to a tube 41 terminating on the bottom of the tank, on the one hand, and to a tube 42, terminating in the gas phase, on the other, (FIG. 1).

At the bottom of portion 4, between sealing rings 5 and 6, a second compartment 43 is provided, which through at least one bore 44 communicates with the first compartment 10 (FIG. 2).

Consequently, any gases from the L.P.G. tank itself that would flow away between the portion 1 of the head piece and the mounting plate of the tank in the event of sealing ring 5 having become out of order, will reach said second compartment 43 and, in the manner described, will be carried off to the atmosphere outside the luggage compartment through bore 44 and compartment 10.

It follows from the above description that both gases flowing through the over-pressure safety valve and any leakage from inlet conduit 15 or outlet conduit 16 are collected in compartment 10 and vented through openings 13 and 14 and tube 11 or 12 to the atmosphere.

Finally the head piece comprises a level meter 45, which in cooperation with so-called reed-relays 46, makes the liquid level in the tank readable on lamps 47. Naturally a different kind of level meter may be employed.

Figure 5:
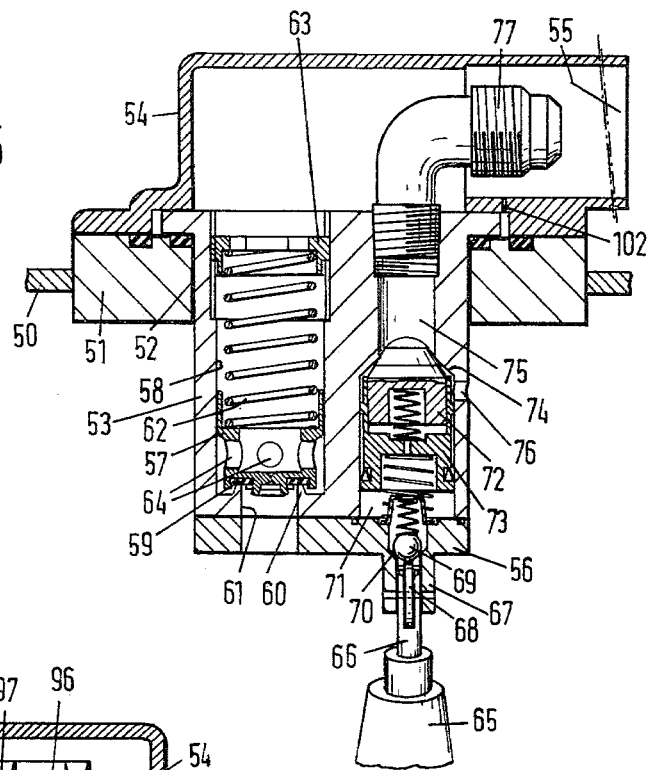
FIGS. 5 and 6 show cross-sectional views, taken on the lines V—V and VI—VI, respectively, of FIG. 4.
Figure 6:
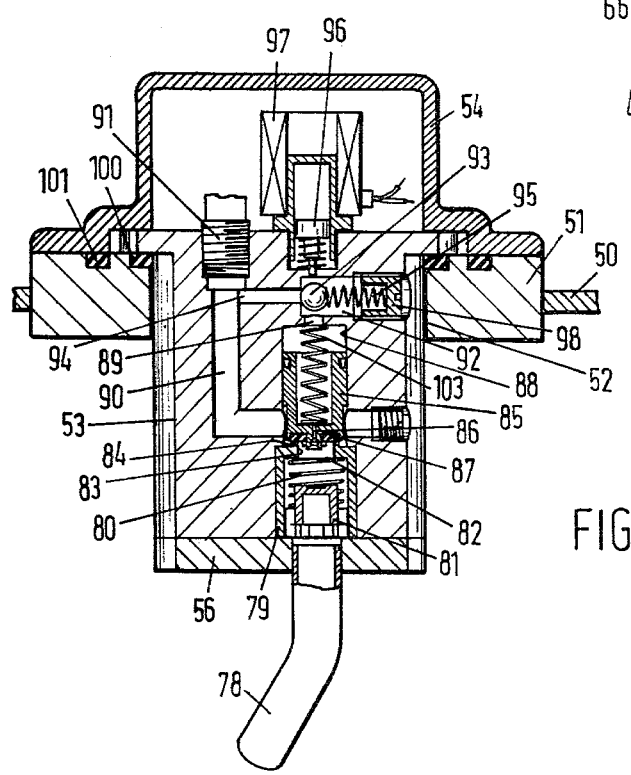

In the embodiment illustrated in FIGS. 4–6, use is made of a mounting plate 51 welded to the wall 50 of a tank. The housing 53 of a head piece is received in an opening 52 of mounting plate 51, and secured therein possibly with screws. This housing is provided at the top with a cover 54, bolted to it, to which a conduit 55 is connected, which conduit communicates with the atmosphere. At its bottom, the housing has a closure plate 56.

Mounted in the head piece, i.e. housing 53, in a bore 58 is a safety valve 57 provided with a resilient sealing ring 59 arranged to cooperate with a seat 60. Seat 60 surrounds a bore 61 communicating with the gaseous phase of the tank. Valve 57 is loaded by a spring 62 supported on a ring 63 mounted in bore 58 in an adjustable manner. The operation of this safety valve will be clear: when the pressure in the tank exceeds a given value, valve 57 will be lifted off its seat 60 against the action of spring 62, which enables gas to escape via bore 61, openings 64 in the valve, bore 58 to cover 54 and thence through conduit 55 to the atmosphere.

Housing 53 further comprises a filling-valve structure, the principle and operation of which is identical to the construction described in Dutch patent application No. 6905739, except for the float construction. This float construction comprises a float 65 secured to a lever 66 pivoted to a supporting member 67 formed on closure plate 56. A pin 68 connected to lever 66 operates a spring-loaded ball 69 arranged to cooperate with a seat 70. As soon as the level in the tank has reached a given position, the float will begin to float, and the spring-loaded ball 69 will be forced onto its seat 70, thereby shutting off compartment 71 from the interior of the tank. As a consequence, the spring-loaded first sealing valve 72 and the second sealing valve 73 will be forced towards their seat 74, whereby the connection between the supply conduit 75 and outlet opening(s) 76 is closed. Supply conduit 75 terminates in a coupling member 77, to which a flexible tube can be connected, which through conduit 55 can be passed outside the vehicle.

Housing 53 of the head piece (see FIG. 6) is further provided with an outlet to the engine. For this purpose a conduit 78 extending to the bottom of the tank connects with the bottom of the housing via closure plate 56. Conduit 78 terminates in the housing in a valve body 79 mounting a valve or flow limiter 81, provided with guide lugs, and loaded by a spring 80. This valve is arranged to seal on a seat 82 provided around an opening 83 in valve body 79. The other end of opening 83 is also provided with a seat 84, with which a delivery valve 85, loaded by a spring 103 can cooperate. Valve 85 is further provided with a bore 86 and with a seat ring 87. Valve 85 is accommodated in a bore 88 to which two passages 89 and 90 connect, which passages lead to the engine via a connecting nipple 91. Passage 90 leads direct to nipple 91, but passage 89 terminates in a compartment 92 accommodating a ball 93 loaded by a spring 95, and to which is further connected a passage 94 leading to nipple 91. Extending into the top of compartment 92 is further the lower end of a core 96 arranged to be energized by an electric magnet 97.

The operation of this "outlet" to the engine is as follows.

When the electric circuit of the engine is closed, the coil will energize the core, and ball 93 will open the passage to nipple 91. Under the influence of the gas pressure (liquid) gas will now flow from the tank through conduit 78, flow limiter 81, opening 83 and passage 90 to nipple 91. Also through bore 86, bore 88, passage 89, compartment 92 and passage 94, liquid gas will flow to the connecting nipple 91. If the electric circuit of the engine is broken, ball 93 will close passage 94, whereby the pressure above and below delivery valve 85 will be equilized: owing to spring 103 the valve will now be forced onto its seat 84, whereby passage 90 will be closed too.

It is noted that spring 95, by means of which ball 93 is forced down, is adjustable by means of a plug 98.

As shown in the drawings (FIG. 4), the other end of nipple 91 opens into a conduit 99 also passing to the atmosphere. A flexible conduit extending to the engine can be connected to nipple 91.

As illustrated further in FIGS. 5 and 6, in order to ensure a gas-tight seal between the cover and the mounting plate 51, plate 51 is equipped with two recesses accommodating sealing rings 100 and 101. The space between sealing rings 100 and 101 is in communication with conduit 55 through the annular slot between the flange of housing 53 and the cover wall and a bore 102. By virtue of this construction any leakage gas is also carried off direct to the atmosphere through conduit 55.

Naturally, parts of the two embodiments shown and described may be interchanged, if necessary with some adaptation.

Furthermore, many modifications will readily occur to those skilled in the art without departing from the scope of the invention. Thus, additional valves may be incorporated in the inlet and outlet ducts leading to and from the head piece. Furthermore, for example, a venting valve may be mounted in the head piece, by means of which the tank can be vented during filling (in particular when it is filled for the first time).

What I claim is:

1. A head piece for a tank for liquefied gas adapted to be mounted in the luggage compartment of a vehicle between an inlet conduit and an outlet conduit, and comprising an over-pressure safety valve, a filling valve with one-way protection, a delivery valve with a flow limiter, and a level meter, said valves functioning generally independently of each other, characterized in that said valves are integrated in the head piece in a compact and space-saving array, which head piece fits at least partly in an opening provided in said tank, said head piece comprising at least a first compartment communicating through at least one tube with the atmosphere outside said luggage compartment, the arrangement being such that the over-pressure safety valve opens into said first compartment, while any leakage from the inlet conduit is collected in said tube, and leakage in the outlet conduit is collected in a tube provided around said outlet conduit, said tube being in turn in communication with said first compartment whereby any leakage from said first compartment in vented to atmosphere.

2. A head piece as claimed in claim 1, characterized in that it comprises a first cylindrical portion fitting in the opening of said tank, and a second, substantially cylindrical portion contiguous with said first cylindrical portion and forced down on said tank in gas-tight relationship by means of bolts, said second portion comprising said first compartment communicating through at least one tube with the atmosphere outside the luggage compartment of the vehicle.

3. A head piece as claimed in either of claims 1 or 2, wherein said head piece is held down on said tank by means of bolts passing through bores terminating between two concentric sealing rings to be pressed down on the tank wall, which sealing rings define a second compartment in said head piece.

4. A head piece as claimed in claim 3, wherein said bores terminate on one side in said second compartment and on the other side in said first compartment.

5. A head piece as claimed in claim 3, wherein, in addition, at least one bore connects said first and second compartments.

6. A head piece as claimed in claim 1, wherein said first compartment is bounded on one side by a closure plate substantially coinciding with one wall of the head piece.

7. A head piece as claimed in either of claims 1 or 2, wherein said first compartment is formed by a cap-shaped cover, by means of which cover the head piece consisting of a housing and the cover is held in position, in full or in part, on the tank or a mounting plate thereof, and to which cover the inlet and outlet conduits and the tubes are connected.

8. A head piece as claimed in claim 7, wherein the housing comprises a flange having a diameter intermediate those of sealing rings provided in recesses of the mounting plate or the tank, and the corresponding cover recess has a larger diameter, the compartment thus formed between said flange and said recess communicating through a bore with said first compartment.

* * * * *